(12) United States Patent
Kushino

(10) Patent No.: US 7,144,347 B2
(45) Date of Patent: Dec. 5, 2006

(54) DIFFERENTIAL LIMITING DEVICE

(75) Inventor: Hiroshi Kushino, Obu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 144 days.

(21) Appl. No.: 11/010,268

(22) Filed: Dec. 14, 2004

(65) Prior Publication Data

US 2005/0148424 A1   Jul. 7, 2005

(30) Foreign Application Priority Data

Jan. 7, 2004   (JP) .............................. 2004-001838

(51) Int. Cl.
*F16H 48/06* (2006.01)
*F16H 48/22* (2006.01)

(52) U.S. Cl. ..................... 475/249; 475/150; 475/154

(58) Field of Classification Search ................ 475/248, 475/249, 150, 154, 343, 220
See application file for complete search history.

(56) References Cited

U.S. PATENT DOCUMENTS

| 5,156,578 | A | | 10/1992 | Hirota |
| 5,269,730 | A | | 12/1993 | Hirota |
| 5,326,333 | A | * | 7/1994 | Niizawa et al. ............. 475/249 |
| 5,464,084 | A | * | 11/1995 | Aoki et al. ................... 192/35 |
| 6,378,677 | B1 | | 4/2002 | Kuroda et al. |
| 6,436,002 | B1 | | 8/2002 | Ishikawa et al. |
| 6,612,956 | B1 | * | 9/2003 | Fukuno et al. ............. 475/199 |

FOREIGN PATENT DOCUMENTS

| EP | 0 409 610 A1 | | 1/1991 |
| EP | 409610 A1 | * | 1/1991 |
| EP | 0 612 929 A2 | | 8/1994 |
| JP | 9-144845 | | 6/1997 |
| JP | 2002-106605 | | 4/2002 |

* cited by examiner

*Primary Examiner*—Sherry Estremsky
*Assistant Examiner*—Edwin A. Young
(74) *Attorney, Agent, or Firm*—Oblon, Spivak, McClelland, Maier & Neustadt, P.C.

(57) ABSTRACT

A differential limiting device includes a planetary gear mechanism, in which a planetary carrier rotatably distributes the rotational power of a front housing to a ring gear and a sun gear through planetary gears and hence, to a first inner shaft and a second inner shaft which are rotatable respectively with the ring gear and the sun gear. A pilot clutch, when in friction engagement, brings about relative rotation between a cam ring and the second inner shaft to axially move the second inner shaft by the action of a cam mechanism provided therebetween. The axial movement of the second inner shaft causes the first inner shaft to be axially moved, whereby a main clutch arranged between the front housing and the first inner shaft is brought into friction engagement. When in friction engagement, the main clutch limits the relative rotation between the ring gear and the planetary carrier.

6 Claims, 2 Drawing Sheets

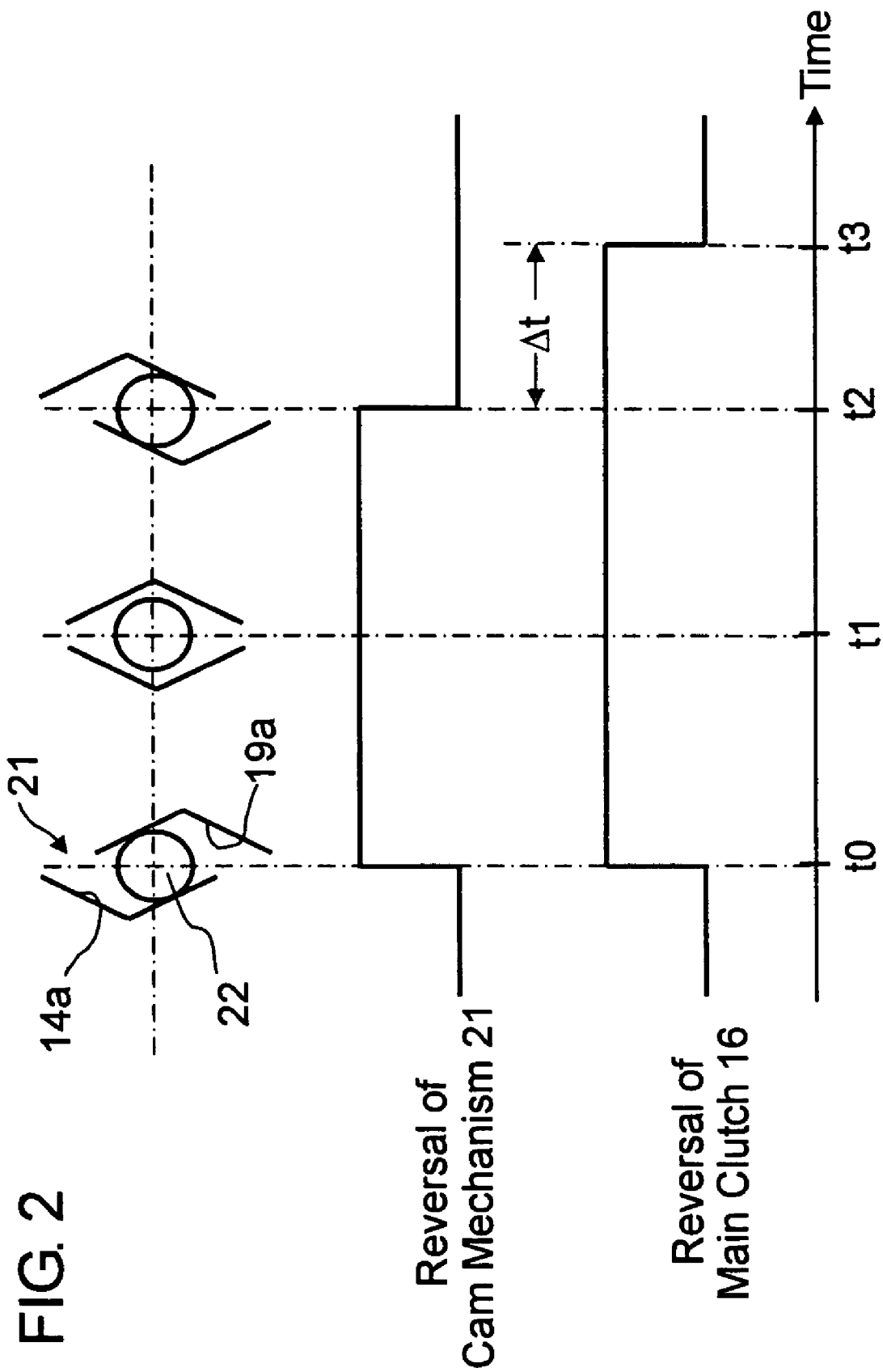

DIFFERENTIAL LIMITING DEVICE

Figure 1:
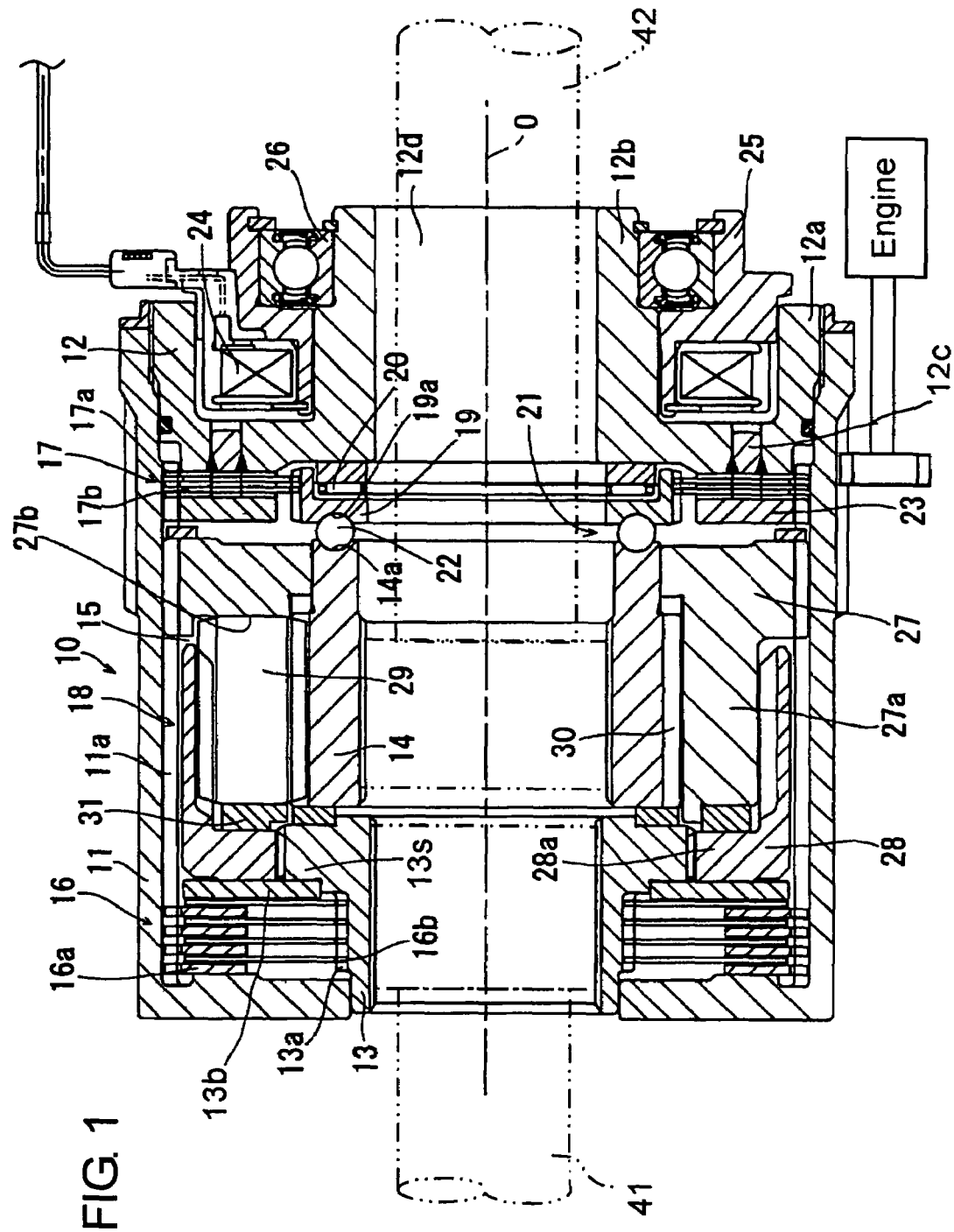

This application claims priority under 35 U.S.C. 119 with respect to Japanese Application No. 2004-1838 filed on Jan. 7, 2004.

BACKGROUND OF THE INVENTION

1. Field of the Invention

The present invention relates to a differential limiting device of the type that the transmission torque of a pilot clutch is amplified by a cam mechanism to bring a main clutch into friction engagement.

2. Discussion of the Related Art

Heretofore, as differential limiting devices for vehicles, there has been known one which is constructed by combining a planetary gear mechanism and an electromagnetic pilot clutch mechanism, as described in Japanese unexamined, published patent application No. 9-144845 (144845/1997).

The differential limiting device described in the patent document is provided with the planetary gear mechanism which is composed of planetary gears in meshing with a sun gear and a ring gear and a housing rotatably receiving the planetary gears in receiving bores thereof. The differential limiting device is further provided with a main clutch arranged between the ring gear and the sun gear. In the differential limiting device, the relative rotation between the housing and the ring gear causes connection means (i.e., the pilot clutch mechanism) to operate, whereby the main clutch is brought into operation to limit or suppress the differential rotation between the sun gear and the ring gear.

Thus, the transmission torque from an engine is transmitted to the housing, and the transmission torque transmitted to the housing is distributed by the planetary gear mechanism to the sun gear and the ring gear. Further, the main clutch is brought into friction engagement by the operation of the electromagnetic pilot clutch mechanism to limit the differential rotation between the ring gear and the sun gear.

The differential limiting device of the aforementioned type is mounted on a drive power transmission system of a vehicle and is used to constitute the vehicle as a four-wheel drive vehicle. In the use of the differential limiting device under this circumstance, it is sometimes the case that reversal occurs in the differential rotation while torque transmission is being performed with the cam mechanism being operated by the pilot clutch. The occurrence of the reversal in the differential rotation causes the differential limiting device or devices around the same to generate a strange noise.

For example, in a four-wheel drive vehicle which employs the aforementioned differential limiting device to distribute the transmission torque from an engine to front and rear wheels, the reversal takes place between the rotational speed of the housing to which the rotation from the engine is transmitted and the rotational speed of the sun gear to which the rotation of the front wheels is transmitted, or the rotational speed of the ring gear to which the rotation of the rear wheels is transmitted. That is, the reversal takes place when the vehicle transitions from the acceleration state to the deceleration state or from the deceleration state to the acceleration state. When the reversal occurs in the differential rotation between the wheels and the engine, the cam rotational angle of the cam mechanism, frictions among the component members and the like may occasionally cooperate to generate the strange noise.

The cause may be analyzed as follows. That is, when a reversal occurs in the cam mechanism, the pressuring force exerted on the main clutch is lost, and the main clutch thus comes not to generate the friction torque. When the differential rotation further proceeds, the main clutch again receives the pressuring force from the cam mechanism and revives to generate a predetermined torque. Where the time continues long during which the main clutch does not generate any friction torque, the rotational speed difference becomes large between the idle rotations of main outer clutch plates and main inner clutch plates, and a large difference in rotational energy is produced therebetween. When the main clutch is restored to the state in which it again transmits the torque, the large difference in energy is absorbed within a very short period of time, which causes the strange noise to be generated at the cam mechanism.

Another differential limiting device described in U.S. Pat. No. 6,378,677 (Japanese unexamined, published patent application No. 2002-106605) has also been known as one which is designed to prevent the generation of such a strange noise. In this patent, it is described at column 11, line 44 through column 12, line 52 that the generations of a strange noise and a shock can be prevented as follows. That is, the backlash at spline engagement portions of a main clutch is made to be larger than the backlash at a spline engagement portion of a cam mechanism. Thus, when the reversal in the differential rotation causes the reversal of the cam mechanism in motion transmission, the reversal motion of the cam mechanism is completed earlier than the main clutch makes an idle rotation through the backlash at the spline engagement portions thereof.

However, where the backlash at the spline engagement portions of the main clutch is made to be larger as described in the aforementioned United States patent, clutch plates of the main clutch are moved in the circumferential direction when not in friction engagement, and this results in generating the strange noise and vibration. Moreover, the amounts have to be controlled of those backlashes which are provided at the spline engagement portions of all the components which compose the main clutch and the cam mechanism. However, it is difficult and impractical in production control to control the backlash amounts of all the portions.

SUMMARY OF THE INVENTION

Accordingly, the present invention is made to solve the foregoing various problems, and it is a primary object of the present invention to provide an improved differential limiting device for a vehicle capable of suppressing the generations of the strange noise and shock which are caused by the reversal in motion transmission of the cam mechanism.

Briefly, according to the present invention, there is provided a differential limiting device for a vehicle comprising a housing rotatable about a rotational axis; first and second inner shafts arranged in the housing in tandem on the rotational axis and each rotatable relative to the housing; a ring gear provided in the housing to be rotatable bodily with the first inner shaft; a sun gear provided on the second inner shaft in the housing to be rotatable bodily with the second inner shaft; a planetary carrier rotatable bodily with the housing in the housing and provided with a support portion; and at least one planetary gear rotatably carried by the support portion of the planetary carrier in meshing engagement with the sun gear and the ring gear. The differential limiting device further comprises a cam ring provided in tandem with the second inner shaft in axial alignment and rotatable relative to the second inner shaft; a pilot clutch for transmitting drive power between the housing and the cam ring when in friction engagement, to selectively effect relative rotation between the cam ring and the second inner shaft; and pilot clutch control means for controlling the friction engagement of the pilot clutch. A cam mechanism is further provided including cam grooves formed on mutually facing end surfaces of the cam ring and the second inner shaft and cam followers held in the cam grooves for axially moving the second inner shaft upon relative rotation between the cam ring and the second inner shaft. A main clutch is also provided for transmitting drive power between the housing rotatable bodily with the planetary carrier and the first inner shaft rotatable bodily with the ring gear, with outer and inner clutch plates thereof being spline-engaged respectively with the housing and the first inner shaft. The main clutch limits the relative rotation between the planetary carrier and the ring gear when brought into friction engagement by the axial movement of the second inner shaft.

In deciding the place where the main clutch is to be arranged, the inventor of the present invention took two states into consideration. That is, one is the state wherein the first inner shaft is idling, with the pilot clutch kept in friction engagement by the pilot clutch control means and hence, with the main clutch kept in friction engagement. The other is the state wherein the second inner shaft is idling, with the pilot clutch kept in friction engagement by the pilot clutch control means and hence, with the main clutch kept in friction engagement. Then, the inventor studied about the differential rotational speeds between any two members of the planetary carrier, the sun gear and the ring gear. As a result, the rotational speed differences were found as specified in the following Table 1.

TABLE 1

| State | Inter-element Differential | Differential Rotation Speed | Speed Ranking |
|---|---|---|---|
| Idling of Second Inner Shaft | Carrier × Sun Gear | N | 2 |
| | Carrier × Ring Gear | $Z_2/Z_1 \times N$ | 3 |
| | Sun Gear × Ring Gear | $(Z_1 + Z_2)/Z_1 \times N$ | 1 |
| Idling of First Inner Shaft | Carrier × Sun Gear | $Z_1/Z_2 \times N$ | 2 |
| | Carrier × Ring Gear | N | 3 |
| | Sun Gear × Ring Gear | $(Z_1 + Z_2)/Z_2 \times N$ | 1 |

In the table, N represents a reference rotational speed,
$Z_1$ represents the number of the ring gear teeth, and
$Z_2$ represents the number of the sun gear teeth wherein a relation of $Z_1 > Z_2$ holds.

As indicated in Table 1, the relative rotation between the planetary carrier and the ring gear is the lowest of the three inter-element relative rotations. Thus, where the main clutch is arranged between the planetary carrier and the ring gear, the reversal in motion transmission of the cam mechanism can be completed earlier than the reversal in motion transmission of the main clutch throughout backlashes at the spline engagement portions thereof. Thus, the cam mechanism completes the reversal in motion transmission while the second inner shaft is being permitted to rotate relative to the housing. In other words, during the reversal motion of the cam mechanism, the second inner shaft is being released from the tight drive connection with any of the housing and the first inner shaft. Thus, upon completion of the reversal motion (i.e., upon the revival of drive connection between the cam ring and the second inner shaft), the second inner shaft which is being released from the tight drive connection with any of the housing and the first inner shaft can easily yield to and follow the rotation of the cam ring. Accordingly, a shock which is generated when the drive connection between the cam ring and the second inner shaft is revived upon the completion of the reversal motion can be suppressed to be small, so that the generation of the strange noise can also be suppressed. This advantageously makes it unnecessary to precisely control the dimensions of the backlashes provided in the main clutch and the cam mechanism in the machining processes therefor.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate identical or corresponding parts throughout the several views, in which:

FIG. 1 is a longitudinal sectional view of a differential limiting device in one embodiment according to the present invention; and FIG. 2 is a time chart showing the occurrences of motion reversals of a cam mechanism and a main clutch.

DETAILED DESCRIPTION OF THE PREFERRED EMBODIMENT

Referring now to FIG. 1, there is shown a differential limiting device 10 in one embodiment according to the present invention. The differential limiting device 10 is used for example to distribute the drive power of an engine (labeled) to front and rear wheels (not shown) in a four-wheel drive vehicle.

A numeral 11 denotes a front housing taking a bottomed cylindrical shape, and the front housing 11 is carried in a clutch case (not shown) to be rotatable about an rotational axis O. The front housing 11 is drivingly connected to an input shaft (not numbered) to which the drive torque from the engine is transmitted, so that the front housing 11 is rotated upon receipt of the drive torque from the engine. A rear housing 12 is screw-secured to an open end portion of the front housing 11. In the front housing 11, a first inner shaft 13 and a second inner shaft 14 are arranged in tandem to be rotatable relative to each other on the rotational axis O and define therearound a receiving chamber 15 which is fluid-tightly filled with lubrication oil. The first and second inner shafts 13, 14 are respectively connected to two output shafts 41 and 42 for transmitting the drive power respectively to the front wheels and rear wheels.

In the receiving chamber 15, a main clutch 16 is received at one axial end, and a pilot clutch 17 is received at the other axial end. A planetary gear mechanism 18 is arranged between the main clutch 16 and the pilot clutch 17. The main clutch 16 is constituted by having plural main outer clutch plates 16a and plural main inner clutch plates 16b arranged in an alternate fashion. The main outer clutch plates 16a are made of iron and are spline-engaged with spline grooves 11a formed on the internal surface of the front housing 11, so that they are prevented from relative rotation to the front housing 11, but are movable relative thereto in the axial direction parallel to the rotational axis O. The main inner clutch plates 16b are each constituted by pasting paper-made friction members on both end surfaces of an iron-made core plate. The main inner clutch plates 16b are spline-engaged with spline grooves 13a formed on the external surface of the first inner shaft 13, so that they are prevented from relative rotation to the first inner shaft 13, but are movable relative thereto in the axial direction parallel to the rotational axis O. The main outer clutch plates 16a and the main inner clutch plates 16b are contacted and frictionally engaged with each other when in engagement, but are separated and disengaged from each other when in separation.

To bring the main outer clutch plates 16a and the main inner clutch plates 16b into friction engagement, the first and second inner shafts 13, 14 are supported to be axially movable through a slight distance. The first inner shaft 13 is provided with a shoulder portion 13s, and a pressuring plate 13b is interposed between the shoulder portion 13s and an endmost one of the main inner clutch plates 16b. Thus, the main clutch 16 is arranged between a bottom end surface of the front housing 11 and the shoulder portion 13s of the first inner shaft 13 in the axial direction and is pressured by the shoulder portion 13s upon the bottom end surface of the front housing 11 when the first inner shaft 13 is axially moved through the slight distance by being pushed by the second inner shaft 14, as described later in detail.

The pilot clutch 17 is composed of plural pilot outer clutch plates 17a and plural pilot inner clutch plates 17b. The pilot outer clutch plates 17a are spline-engaged with the spline grooves 11a of the front housing 11, so that they are prevented from relative rotation to the front housing 11, but are movable relative thereto in the axial direction parallel to the rotational axis O. The pilot inner clutch plates 17b are arranged in an alternate fashion with the pilot outer clutch plates 17a and are spline-engaged with the external surface of a cam ring 19 arranged between the second inner shaft 14 and the rear housing 12, so that they are prevented from relative rotation to the cam ring 19, but are movable relative thereto in the axial direction parallel to the rotational axis O. The cam ring 19 is rotatably carried at its one end surface on the rear housing 12 through a needle bearing 20. Plural cam grooves 19a constituting a cam mechanism 21 are formed on the other end surface of the cam ring 19 at a regular interval in the circumferential direction thereof.

On an end surface facing the cam ring 19 of the second inner shaft 14, there are formed plural cam grooves 14a at a regular interval in the circumferential direction thereof. These cam grooves 14a and the cam grooves 19a formed on the cam ring 19 define plural cam spaces, which respectively retain ball-like cam followers 22 therein. Thus, the cam mechanism 21 is composed of the second inner shaft 14, the cam ring 19 and the cam followers 22. The backlash in the cam mechanism 21 is set to be equal to or greater than the backlash that the main outer clutch plates 16a define at the spline engagement portions with the spline grooves 11a and than the backlash that the main inner clutch plates 16b define at the spline engagement portions with the spline grooves 13a.

An annular armature 23 is arranged between the pilot clutch 17 and the planetary gear mechanism 18. The armature 23 is spline-engaged at its external surface with the spline grooves 11a formed on the internal surface of the front housing 11, so that it is prevented from relative rotation to the front housing 11, but is movable relative thereto in the axial direction parallel to the rotational axis O. At the axial outer side of the rear housing 12, there is arranged an electromagnet 24 which serves as pilot clutch control means. By the magnetic flux which is produced by the electromagnet 24, the armature 23 is attracted to pressure the pilot outer clutch plates 17a and the pilot inner clutch plates 17b upon the rear housing 12. The friction engagement force of the pilot clutch 17 is controllable by controlling the electric current flowing through the electromagnet 24.

The rear housing 12 is secured to the open end portion of the front housing 11 at a portion (right side as viewed in FIG. 1) behind the pilot outer clutch plates 17a. The rear housing 12 is composed of a large-diameter rear housing portion 12a made of a magnetic metal, a small-diameter rear housing portion 12b made of a magnetic metal, and an intermediate member 12c made of a non-magnetic metal. The large-diameter rear housing portion 12a takes a cylindrical shape and is screw-fixed to the internal surface of the open end portion of the front housing 11. The small-diameter rear housing portion 12b is of a stepped cylindrical shape formed with an internal bore 12d, through which the output shaft 42 spline-engaged with the second inner shaft 14 passes for transmission of drive power to the rear wheels. The intermediate member 12c of an annular shape is interposed between the internal surface of the large-diameter rear housing portion 12a and the outer surface of the small-diameter rear housing portion 12b and is secured by welding or the like to the large-diameter rear housing portion 12a and the small-diameter rear housing portion 12b.

The electromagnet 24 takes an annular shape and has electric current applied thereto through a terminal (not numbered). The electromagnet 24 is secured to a yoke 25 at a position surrounded by the large and small-diameter rear housing portions 12a, 12b and the intermediate member 12c. The yoke 25 is rotatably carried on the small-diameter rear housing portion 12b through a bearing 26 with a small clearance being held relative to the large and small-diameter rear housing portions 12a, 12b.

The planetary gear mechanism 18 is primarily composed of a planetary carrier 27, a ring gear 28, several (usually, three) planetary gears 29, and a sun gear 30 which is formed on the second inner shaft 14. The planetary carrier 27 is arranged between the front housing 11 and the second inner shaft 14. The planetary carrier 27 is spline-engaged with the spline grooves 11a of the front housing 11 at the external surface thereof and is mounted with a play on the second inner shaft 14 at the internal surface thereof. The planetary carrier 27 is provided with an annular support portion 27a, in which plural receiving bore 27b each extending in parallel to the rotational axis O are formed at a regular interval in the circumferential direction. The receiving bore 27b are opened at the internal surface side and the external surface side of the annular support portion 27a and respectively receives the planetary gears 29 to be rotatable therein. Respective one ends (right ends as viewed in FIG. 1) of the planetary gears 29 are kept in contact with bottom end surfaces of the receiving bore 27b, while respective other ends (left ends as viewed in FIG. 1) of the planetary gears 29 are kept in contact with an inner end surface of the ring gear 28 through a thrust washer 31. The planetary gears 29 are in meshing with the sun gear 30 and also in meshing with the ring gear 28 through openings formed at the internal surface side and the external surface side of the annular support portion 27a. Thus, when the front housing 11 is rotationally driven by being given the drive torque from the engine, the rotation is transmitted to the ring gear 28 (hence, to the first inner shaft 13) and the sun gear 30 (hence, to the second inner shaft 14) through the planetary carrier 27 and the planetary gears 29. At this time, the ring gear 28 and the sun gear 30 are rotated bodily when the planetary gears 29 are not rotated about their own axes, while differential rotations of the ring gear 28 and the sun gear 30 are given when the planetary gears 29 are rotated about their own axes.

The ring gear 28 is arranged between the front housing 11 and the support portion 27a of the planetary carrier 27 and has a disc-like joint portion 28a formed at an end thereof which is on the side of the main clutch 16. The internal surface of the joint portion 28a is connected with the first inner shaft 13 through spline engagement to be rotatable bodily therewith.

(Operation)

The operation of the embodiment as constructed above will be described hereinafter. While the drive torque is transmitted from the engine to the front housing 11 through the input shaft (not numbered) with electric current being not applied to the electromagnet 24, the front housing 11 bodily joined with the rear housing 12 is rotated together with the rear housing 12. The planetary carrier 27, the main outer clutch plates 16a and the pilot outer clutch plates 17a which are engaged with the spline grooves 11a of the front housing 11 are rotated upon rotation of the front housing 11. When the armature 23 has not been attracted by the electromagnet 24 because of no electric current being applied to the same, the pilot outer clutch plates 17a and the pilot inner clutch plates 17b are out of friction engagement, so that the pilot outer clutch plates 17a are rotated together with the front housing 11 without transmitting the drive power to the pilot inner clutch plates 17b. Similarly, the main outer clutch plates 16a are out of friction engagement with the main inner clutch plates 16b, so that the main outer clutch plates 16a are also rotated together with the front housing 11 without transmitting the drive power to the main inner clutch plates 16b.

The planetary carrier 27, when rotated, causes the planetary gears 29 received in the receiving bores 27b, to revolve around the rotational axis O together with the planetary carrier 27. When the vehicle is in the state of straight-ahead traveling at this time, the planetary gears 29 are revolved, whereby the drive power from the engine is distributed to the first inner shaft 13 and the second inner shaft 14 respectively through the ring gear 28 and the sun gear 30. On the contrary, when the vehicle comes to be in the state of a left or right turn, a braking phenomenon takes place due to the difference in turn radius between the front wheels and the rear wheels. The braking phenomenon causes the ring gear 28 and the sun gear 30 to be relatively rotated since the planetary gears 29 are revolved around the sun gear 30 and at the same time, are rotated about their own axes within the receiving bores 27b. Thus, the planetary gear mechanism 18 distributes much more drive power to either the front wheels (i.e., the first inner shaft 13) or the rear wheels (i.e., the second inner shaft 14) which have a smaller load exerted thereon, while absorbing the relative rotation between the ring gears 28 and the sun gear 27.

Further, when a slip occurs at either the front wheels or the rear wheels, the planetary gear mechanism 18 tends to distribute much more drive power to the front wheels or the rear wheels on which a smaller load is being exerted, so that much more drive power tends to be distributed to the front wheels or the rear wheels which are slipping. However, when such a slip occurs, electric current is applied to the electromagnet 24, and a loop magnetic flux is formed around the electromagnet 24. The armature 23 is thus attracted toward the rear housing 12, and the pilot outer clutch plates 17a are brought into friction engagement with the pilot inner clutch plates 17b. As a result, the rotational force controlled by the electromagnet 24 is transmitted from the front housing 11 to the cam ring 19 to produce the relative rotation between the second inner shaft 14 and the cam ring 19, and the cam followers 22 are caused to run on the cam grooves 14a, 19a. The running of the cam followers 22 on the cam grooves 14a, 19a causes the axial space between the second inner shaft 14 and the cam ring 19 to be widened, and the second inner shaft 14 is moved toward the first inner shaft 13. Thus, the first inner shaft 13 is pressured by the second inner shaft 14 and brings about the pressuring contact between the main inner clutch plates 16b and the main outer clutch pates 16a through the pressuring plate 13b. As a consequence, the main clutch 16 is enabled to transmit the transmission torque which is amplified by the cam mechanism 21, that is, which depends on the magnitude of the magnetic flux produced by the electromagnet 24, from the front housing 11 to the first inner shaft 13 and restrains or limits the amount of the differential rotation between the ring gear 28 and the sun gear 30, so that the drive power from the engine is transmitted to the front wheel and the rear wheels at an appropriate distribution ratio.

Next, description will be made regarding the operation which the embodiment performs when the vehicle changes from the deceleration state to the acceleration state or the acceleration state to the deceleration state with the main clutch 16 kept in pressured contact by the application of electric current to the electromagnet 24. In the acceleration state or in the deceleration state, the cam ring 19 and the second inner shaft 14 have been rotated relatively, and the cam followers 22 have run on the cam grooves 14a, 19a. When change is made from the acceleration state to the deceleration state or vice versa, a reversal is brought about in the differential rotation between the second inner shaft 14 and the cam ring 19. That is, the second inner shaft 14 and the cam ring 19 are reversed in their rotational speeds. When the reversal is brought about in the differential rotation, the cam mechanism 21 once releases the main clutch 16 from the pressuring force and again exerts the pressuring force on the main clutch 16. At this time, the planetary gear mechanism 18 is performing the torque transmission in the following relation shown in Table 1 in dependence on the gear tooth ratio of the ring gear 28 to the sun gear 30.

"Rotational Difference Between Ring Gear 28 and Front Housing 11">"Rotational Difference between Front Housing 11 and Sun Gear 30" Thus, the cam mechanism 21 completes the reversal in motion transmission earlier than the main outer and inner clutch plates 16a, 16b complete the reversals in motion transmission through the backlashes at their spline engagement portions with the front housing 11 and the first inner shaft 13. Accordingly, since the reversals of the main outer clutch plates 16a and the main inner clutch plates 16b are completed after the completion in reversal of the cam mechanism 21, the cam mechanism 21 can be prevented from generating the strange noise at the time of completing the reversal in the torque transmission.

More specifically, as shown in FIG. 2, before the occurrence of the reversal in torque transmission, the cam grooves 19a and 14a of the cam ring 19 and the second inner shaft 14 are kept in tight connection as those schematically illustrated at the time point t0. When change is made from the acceleration state to the deceleration state or vice versa, the reversal of the cam mechanism 21 begins to release the main clutch 16 from the pressuring force. Thus, the main clutch 16 is released from the friction engagement and is brought into the reversal at the same time. At the time point t1, the main clutch 16 is placed in the state of no friction connection. The cam mechanism 21 completes the reversal at the time point t2 and again exerts the pressuring force on the main clutch 16. However, the main clutch 16 is still in the course of the reversal, so that the second inner shaft 14 is being permitted to rotate relative to the housing 11.

In other words, during the reversal motion of the cam mechanism 19, the second inner shaft 14 has been released from the tight drive connection with any of the front housing 11 and the first inner shaft 13. Thus, when the cam mechanism 19 is again brought into drive connection upon completion of the reversal at the time point t2, the second inner shaft 14 which remains out of the tight drive connection with any of the housing 11 and the first inner shaft 13 can easily yield to and follow the rotation of the cam ring 19. Accordingly, a shock which is generated when the drive connection between the cam ring 19 and the second inner shaft 14 is revived upon the completion of the reversal motion can be suppressed to be small, and therefore, the generation of the strange noise can also be suppressed. Then, the reversal in motion transmission between the main outer and inner clutch plates 16a, 16b are terminated at the time point t3 which is behind the time point t2 by a minute time period Δt. This advantageously makes it unnecessary to precisely control the dimensions of the backlashes provided in the main clutch 16 and the cam mechanism 19 in the machining processes therefor.

It is needless to say that the minute time period or time difference Δt is set longer than a fluctuation in time period which may be caused by a dispersion of the backlashes provided in the main clutch 16 and the cam mechanism 19 in the machining processes therefor.

Obviously, numerous modifications and variations of the present invention are possible in light of the above teachings. It is therefore to be understood that within the scope of the appended claims, the present invention may be practiced otherwise than as specifically described herein.

What is claimed is:

1. A differential limiting device for a vehicle comprising:
a housing rotatable about a rotational axis;
first and second inner shafts arranged in the housing in tandem on the rotational axis and each rotatable relative to the housing;
a ring gear provided in the housing to be rotatable bodily with the first inner shaft;
a sun gear provided on the second inner shaft in the housing to be rotatable bodily with the second inner shaft;
a planetary carrier rotatable bodily with the housing in the housing and provided with a support portion;
at least one planetary gear rotatably carried by the support portion of the planetary carrier in meshing engagement with the sun gear and the ring gear;
a cam ring provided in tandem with the second inner shaft in axial alignment and rotatable relative to the second inner shaft;
a pilot clutch for transmitting drive power between the housing and the cam ring when in friction engagement, to selectively effect relative rotation between the cam ring and the second inner shaft;
pilot clutch control means for controlling the friction engagement of the pilot clutch;
a cam mechanism including cam grooves formed on mutually facing end surfaces of the cam ring and the second inner shaft and cam followers held in the cam grooves for axially moving the second inner shaft upon relative rotation between the cam ring and the second inner shaft; and
a main clutch provided for transmitting drive power between the housing rotatable bodily with the planetary carrier and the first inner shaft rotatable bodily with the ring gear, with outer and inner clutch plates thereof being spline-engaged respectively with the housing and the first inner shaft, whereby the main clutch operates to limit the relative rotation between the planetary carrier and the ring gear when brought into friction engagement by the axial movement of the second inner shaft.

2. The differential limiting device as set forth in claim 1, wherein:
the housing is formed with spline grooves at an internal surface thereof; and
the outer clutch plates of the main clutch, the planetary carrier, and outer clutch plates of the pilot clutch are engaged with the spline grooves of the housing at external surfaces thereof for bodily rotation with the housing.

3. The differential limiting device as set forth in claim 2, wherein:
a planetary gear mechanism is composed of the ring gear, the sun gear, the planetary carrier and the at least one planetary gear; and
the main clutch and the pilot clutch are provided to be spaced axially with the planetary gear mechanism arranged therebetween.

4. The differential limiting device as set forth in claim 2, wherein:
the first inner shaft is axially movable by the second inner shaft and is provided with a shoulder portion; and
the main clutch is arranged between a bottom end surface of the housing and the shoulder portion of the first inner shaft in the axial direction to be pressured by the shoulder portion upon the bottom end surface of the housing when the first inner shaft is axially moved.

5. The differential limiting device as set forth in claim 2, wherein:
the support portion of the planetary carrier comprises an annular support portion extending into an annular space defined between the sun gear and the ring gear and provided with plural bores spaced in the circumferential direction, each of the plural bores having openings at internal and external surfaces of the annular support portion; and
the at least one planetary gear includes plural planetary gears rotatably received respectively in the plural bores and each in meshing with the sun gear and the ring gear through the openings.

6. The differential limiting device as set forth in claim 2, wherein:
the housing is rotatable upon receipt of rotational torque from an engine, and
the first and second inner shafts are connectable respectively to front wheels and rear wheels of the vehicle.

* * * * *